L. UNDERWOOD.
Hay-Loader.
No. 160,556. Patented March 9, 1875.
2 Sheets--Sheet 2.
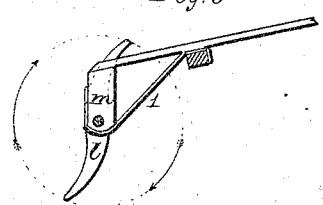
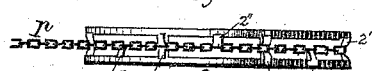
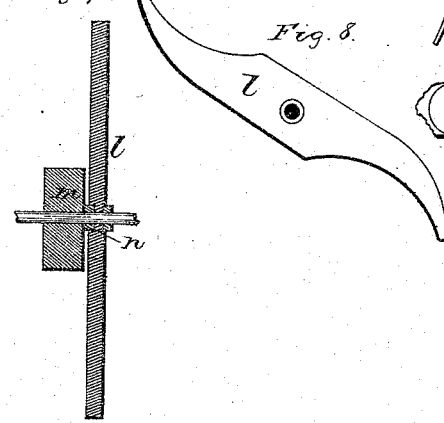
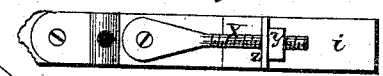
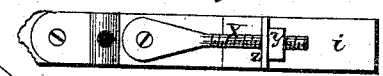
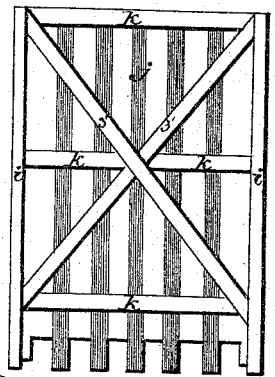
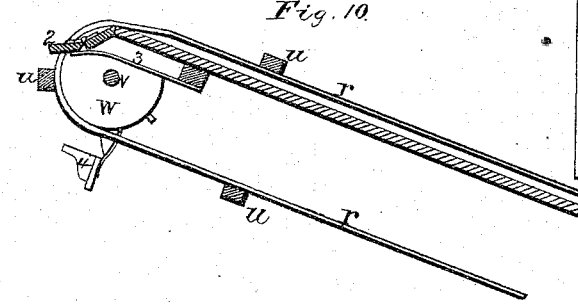
WITNESSES
INVENTOR
L. Underwood
per
F. A. Lehmann, Atty.
THE GRAPHIC CO.PHOTO-LITH.39 & 41 PARK PLACE,N.Y.

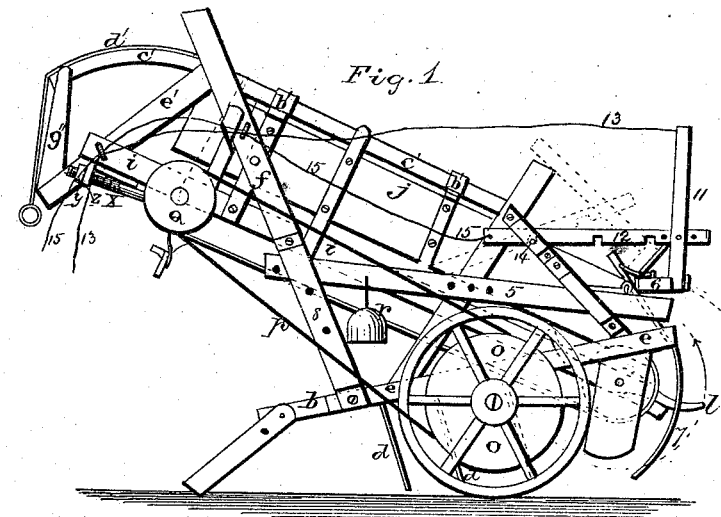

UNITED STATES PATENT OFFICE.

LESTER UNDERWOOD, OF OTTAWA, ILLINOIS.

IMPROVEMENT IN HAY-LOADERS.

Specification forming part of Letters Patent No. 160,556, dated March 9, 1875; application filed January 4, 1875.

*To all whom it may concern:*

Be it known that I, LESTER UNDERWOOD, of Ottawa, in the county of La Salle and State of Illinois, have invented certain new and useful Improvements in Hay and Grain Rakes and Loaders; and I do hereby declare the following to be a full, clear, and exact description of the invention, such as will enable others skilled in the art to which it pertains to make and use it, reference being had to the accompanying drawings, which form part of this specification.

My invention relates to an improvement in hay and grain rakes and loaders; and it consists in the arrangement and combination of devices, which will be more fully described hereafter.

The accompanying drawing represents my invention.

$a$ represents the axle, $b$ the tongue, and $c$ the braces, which project out from the axle to the tongue, which parts form a frame-work, upon which the balance of machine rests. Passing down through these parts are a number of rods, $d$, so arranged in relation to each other as not to be in line, so that as the machine is drawn along these rods will break up the cocks or heaps of hay or grain, and distribute it evenly over the ground, to be caught up by the revolving forks. Secured upon the top of the axle, near each end, are the horizontal beams $e$, to the rear ends of which is secured the rear end of the elevator bed and frame, while from their front ends rise the inclined standards $f$, which are also secured to the sides of the frame at different points, as shown. In order to brace the beams $e$, and hold them rigidly in position, their front ends are bound together by the cross-beam $g$, and from this cross-beam extend slantingly upward two or more tie-rods, $h$, to the front standards $f$. Secured to the insides of the inclined beams $f$ and horizontal beams $e$, at any desired angle, are the beams $i$, upon the tops of which is placed the elevator-bed $j$, and which beams $i$ are connected together by a number of cross-beams, $k$, and across the under sides of these beams $k$ are fastened the two diagonal braces 3′, which cross each other at their centers like the letter X. The bottom of the bed $j$ has its rear end notched or slotted, the slots being arranged at equal distances apart, and of such a depth as to allow the curved forks $l$ to revolve freely around. To the under side of each of the extensions on each side of the slots are secured the bearings for the forks, each one of which is placed loosely upon a fixed rod, which passes through from side to side. These bearings or blocks $m$ may be fastened in position by means of the straps 1, or any other devices, and each one has a recess in one or both of its sides to receive a washer, $n$. These washers are recessed in the sides of the forks, and serve to prevent hay or sticks from working up between the forks and blocks, and thus preventing the forks from turning around. Secured to the inside of each of the driving-wheels is a sheave-pulley, $o$, around which pass the driving-chains $p$ to the smaller pulleys Q, which pulleys Q have ratchets secured to their sides, so that when the machine moves forward they operate the carrier-belts $r$, but slip idly around when the machine is being backed. Each of these pulleys has its edges grooved, and on the sides of these grooves are formed the projections 2″, upon which the links of the chain catch, in order to prevent them from slipping. These projections are arranged alternately in pairs and single ones, the single ones being alternately placed upon the opposite sides of the groove. By this arrangement of catches or projections any kind of a chain may be used without the possibility of slipping. Upon the top of the elevator-bed $s$, which is composed of longitudinal slats, and entirely closed its whole length, are placed the two metallic guides or ways $t$, upon which the carrier-rods $u$ travel, so as to decrease the friction, and make them move more regularly. In order to prevent these rods from being worn and cut by rubbing upon these guides, each of them is provided with metallic facings, which prevent the wood from coming in contact with the guides. These facings may consist of flat plates or of wires bent into suitable shape. In order to tighten the belts when they become slack and loose, the shaft V, to which the toothed pulleys W are secured, is hung in boxes, which can be drawn forward, carrying the shaft with them, by means of the screw adjusting-rods X, fastened to the boxes, the nuts $y$, and stops Z. Hinged to the upper end of the bed is a slat, 2, which projects outward and downward at an angle of about forty-five degrees. Bearing against this slat from its rear side are two springs, 3, which allow it to give as the rods of the belts press down upon it, and after they have passed over it springs outward into position again. Some distance back and below this spring-slat is another slat, 4, which is suspended from the frame by suitable spring-hangers, and over the top of which the carrier-rods pass. These slats serve to prevent any of the hay or grain from being carried downward over the end of the bed. Pivoted to the top of the two pivoted levers 5, at a short distance from their rear ends, is the rake-head 6, to which the teeth 7 are secured. These teeth are of the curved form shown, have a coil formed near their upper ends, just in front of the head, have their upper ends stuck into the top of the head, and are then held in place by having staples driven down over them, so as to hold them securely in position. The levers 5 are pivoted to the side of the elevator-bed, have their front ends passed through suitable guards or guides 8, and have weights attached to them, so as to just about counterbalance the rake. By shifting these weights back and forth the pressure of the rake can be controlled at will, so as to cause it to give way in coming in contact with an obstruction before breaking. Secured to the rake-head, at some distance above and in front of it, is a cross-beam, 9, to which are attached a number of flat thin plates, 10, which have holes in their lower ends, so as to pass over the teeth, as shown, and then have their ends turned upward along the teeth. These plates form guards for the teeth, and prevent the hay or grain from rising too high upward out of the reach of the forks. Secured to the rake-head is a lever, 11, which has a latch, 12, pivoted to it, near its center, and a cord, 13, tied to its top, which cord extends forward to the front of the machine. The latch 12 has a number of notches cut in its lower edge, so as to catch over a catch, 14, and has a cord, 15, attached to its front end, which also extends forward to the front of the machine. By pulling upon the cord 13 the rake is raised upward from the ground, and the latch automatically locks it in position. By pulling upon cord 15 the latch is loosened, and the rake drops back into position. Across the top of the bed are secured two cross-bars, $a'$, upon which are placed the loops or guides $b'$. Moving back and forth through these guides are two long rods, $c'$, the front ends of which are curved downward, as shown, and which rods can be adjusted back and forth. Upon the top of these rods is placed an apron or covering, $d'$, which prevents the wind from blowing the hay or grain about as it reaches the upper end of the bed. Secured to the inside of the front ends of the inclined beams $f\ i$ are the bars $e'$, to which the front ends of the adjustable rods $c'$ are attached by means of the connecting-rods $g''$, the connecting-rods serving to limit the movement of the rods $c'$. Over the sides of the upper end of the bed are also arranged aprons, so as to effectually protect the grain from the wind.

Having thus described my invention, I claim—

1. The rods $d$, projecting down through the axle, braces, and tongue, for the purpose of scattering the hay or grain, substantially as set forth.

2. The combination of the hay-rake and weighted levers, the rake being pivoted upon the rear end of the levers, substantially as shown and described.

3. The combination of the rake, weighted levers, and holding-latch, the rake being pivoted upon the end of the levers, and held in any desired position, substantially as described.

4. The combination of the rake, weighted levers, holding-latch 12, lever 11, and cords 13 and 15, substantially as specified.

5. The pulleys $o$, having the projections or catches $2''$, arranged alternately in pairs and single ones, substantially as shown.

6. The combination of the revolving forks, blocks $m$, and washer $n$, the washer being countersunk into the forks to prevent hay or grain from working between them, substantially as shown and described.

7. The hinged spring-slat 2, arranged at the head of the bed to prevent the downward passage of hay or grain, substantially as specified.

8. The combination of the slats 2 4, substantially as shown and described.

9. The combination of the adjustable rods $c'$, apron $d'$, connecting-rods $g'$, and bars $e'$, substantially as shown and described.

In testimony that I claim the foregoing I have hereunto set my hand this 17th day of December, 1874.

LESTER UNDERWOOD.

Witnesses:
  T. B. McDonough,
  J. H. Fleming.